(12) United States Patent
Brenner

(10) Patent No.: US 7,439,706 B2
(45) Date of Patent: Oct. 21, 2008

(54) BATTERY DETERMINATION SYSTEM FOR BATTERY-POWERED DEVICES

(75) Inventor: Erich Brenner, Großengersdorf (AT)

(73) Assignee: AKG Acoustics GmbH, Vienna (AT)

( * ) Notice: Subject to any disclaimer, the term of this patent is extended or adjusted under 35 U.S.C. 154(b) by 409 days.

(21) Appl. No.: 10/961,237

(22) Filed: Oct. 7, 2004

(65) Prior Publication Data

US 2005/0099156 A1 May 12, 2005

(30) Foreign Application Priority Data

| Oct. 7, 2003 | (EP) | .................................. 03450225 |
| Jan. 16, 2004 | (AT) | .................................. A 52/2004 |

(51) Int. Cl.

| H02J 7/00 | (2006.01) |
| G08B 21/00 | (2006.01) |
| H04B 1/38 | (2006.01) |
| G01N 27/416 | (2006.01) |

(52) U.S. Cl. ........................ 320/106; 320/132; 320/134; 320/136; 320/116; 340/636.1; 307/125; 307/66; 307/150; 455/572; 455/573; 324/427; 324/433

(58) Field of Classification Search .................. 320/116, 320/106, 112, 132; 324/427, 433; 340/636.1; 307/125, 66, 150; 455/572, 573
See application file for complete search history.

(56) References Cited

U.S. PATENT DOCUMENTS

| 5,237,257 A | * | 8/1993 | Johnson et al. | ............. 320/106 |
| 5,371,453 A | * | 12/1994 | Fernandez | .................. 320/136 |
| 5,510,690 A | * | 4/1996 | Tanaka et al. | ............... 320/106 |
| 5,534,765 A | * | 7/1996 | Kreisinger et al. | .......... 320/106 |
| 5,581,171 A | * | 12/1996 | Kerfoot et al. | .............. 320/137 |
| 5,587,924 A | * | 12/1996 | Rossi | .......................... 702/63 |

(Continued)

FOREIGN PATENT DOCUMENTS

EP   0 786 821 A1   7/1997

(Continued)

OTHER PUBLICATIONS

Tracy et al., Aplication Note AN255-02, Philips Semiconductors, Dec. 19, 2002, p. 1-58.*

(Continued)

*Primary Examiner*—Matthew V Nguyen
*Assistant Examiner*—Jue Zhang
(74) *Attorney, Agent, or Firm*—Brinks Hofer Gilson & Lione

(57) ABSTRACT

This system provides a method for determining whether ordinary battery cells, a battery pack, and/or a charger unit are attached to a portable electronic device. The system provides a center contact in a battery shaft that contacts a battery pack or a point on an individual battery and allows the device regulation unit to measure the voltage at that point. If the voltage is below a particular threshold, then the system determines that a battery pack may be inserted in the battery shaft and the portable electronic unit enters a battery pack mode. If the voltage is above the threshold voltage, then the portable electronic device enters the battery operation mode. If a voltage transition is sensed on the DEVICE START line, the portable electronic device determines that the charger is installed and the portable electronic device enters the appropriate mode.

24 Claims, 7 Drawing Sheets

U.S. PATENT DOCUMENTS

| | | | | |
|---|---|---|---|---|
| 5,646,506 A | * | 7/1997 | Suzuki | 320/145 |
| 5,646,508 A | | 7/1997 | van Phuoc et al. | |
| 5,717,306 A | * | 2/1998 | Shipp | 307/125 |
| 5,717,307 A | * | 2/1998 | Barkat et al. | 340/636.1 |
| 5,736,271 A | * | 4/1998 | Cisar et al. | 429/96 |
| 5,738,954 A | * | 4/1998 | Latella et al. | 429/97 |
| 5,844,400 A | * | 12/1998 | Ramsier et al. | 320/106 |
| 5,850,134 A | * | 12/1998 | Oh et al. | 320/106 |
| 5,861,729 A | * | 1/1999 | Maeda et al. | 320/106 |
| 5,925,942 A | * | 7/1999 | Theobald | 307/125 |
| 6,060,864 A | * | 5/2000 | Ito et al. | 320/136 |
| 6,112,105 A | * | 8/2000 | Olsson | 455/572 |
| 6,154,004 A | * | 11/2000 | Higuchi | 320/106 |
| 6,157,309 A | * | 12/2000 | Mitsui et al. | 340/636.1 |
| 6,285,158 B1 | | 9/2001 | Higuchi | |
| 6,291,967 B1 | | 9/2001 | Higuchi | |
| 6,344,730 B1 | | 2/2002 | Rohrböck et al. | |
| 6,384,572 B1 | * | 5/2002 | Nishimura | 320/106 |
| 6,437,536 B2 | * | 8/2002 | Higuchi | 320/106 |
| 6,504,341 B2 | * | 1/2003 | Brotto | 320/106 |
| 6,625,477 B1 | * | 9/2003 | Wakefield | 455/572 |

FOREIGN PATENT DOCUMENTS

EP        0 786 821 B1     1/2003

OTHER PUBLICATIONS

Maxim/Dallas Semiconductor, Application Note 476, Maxim/Dallas Semiconductor, Dec. 1, 2000, p. 1-5.*

* cited by examiner

BATTERY DETERMINATION SYSTEM FOR BATTERY-POWERED DEVICES

PRIORITY CLAIM

This application claims priority under 35 U.S.C. § 119(a)-(d) to European Patent Application No. 03450225.2, filed Oct. 7, 2003, and Austrian Patent Application A 52/2004, filed on Jan. 16, 2004, which are incorporated herein by reference.

BACKGROUND OF THE INVENTION

1. Technical Field

The present invention relates to battery-powered electronic devices that operate and receive power from batteries, battery packs and charger units and determine whether batteries or battery packs are inserted in the battery-powered device.

2. Related Art

Many electronic devices have become portable enabling their users to remain mobile while receiving the benefits of the portable device. These electronic devices generally require batteries or battery cells to supply the required power for operation, and may include digital cameras, camcorders, wireless microphones, laptop computers, cell phones, and power tools. Many of these devices may have a display that indicates the remaining charge of the battery or battery pack associated with the device. Thus, the operator can determine whether the device will perform as required without running out of power at some critical point. If the remaining charge is too low, the operator may plug the device into a power supply, charging the batteries or battery pack while operating the device simultaneously.

Battery packs are available that have at least one, but generally two or more, rechargeable batteries or battery cells. Contrary to the name, battery packs do not have ordinary batteries, but may contain rechargeable cells. Some battery packs are equipped with a monitoring unit by which a variety of the device operating parameters may be monitored, stored, and displayed. The monitoring unit may query and monitor the state of charge, the state of the battery, and/or the status of the charging unit through contacts provided on the battery pack. The status of the battery pack may be communicated to the battery powered device. Such a device is described in U.S. Pat. No. 6,437,536 and is herby incorporated by reference in its entirety. However, this device does not discriminate between ordinary batteries that are individually inserted into the device and the battery packs that might hold the ordinary batteries.

Special battery charging units may connect directly to the battery-powered device and may contain slots for inserting storage batteries or battery packs. Some battery charging units may allow the batteries to be inserted into the special slots in the charging unit when the charging unit is removed from the electronic device. Other battery charging units allow for several battery packs or storage batteries to be inserted and charged simultaneously. Still other battery chargers may simultaneously charge the storage batteries that are inserted into the charging unit as well as charge the storage batteries that are in an electronic device connected to the charger. As previously mentioned, a data exchange also may occur between the charging unit and the electronic device, communicating the state of the battery pack and the status of the charging unit. Other chargers may be configured to serve as a line voltage-device, supplying power to the electronic device while keeping a trickle charge on the fully charged batteries within the electronic device.

These contemporary power supplies exchange information between the battery pack and the charger, and sometimes to the device in which the battery pack is found. This exchange of information may be accomplished with additional lines through the use of different bus systems. In many applications, especially in radio microphones, there are requirements concerning electromagnetic interference of such devices. The bus systems, because of their location within the system, may exhibit or produce interference radiation, posing a problem for many applications. Another problem may involve additional contacts between the battery pack and the device. Openings in the area of the battery shaft have been avoided in order to protect the electronic circuitry against electrostatic discharge. The additional contact points in the housing represent not only an extra cost, but may present problems because of the additional contacts and openings in the battery shaft area.

Various devices and methods have been developed to determine the amount of charge remaining in a battery. For example, a solution is provided in U.S. Pat. No. 6,344,730 A, which is hereby incorporated by reference. This solution is based on the relationship between voltage and the charge in the batteries. However, it has not solved the problem where different types of rechargeable batteries have been incorporated or where the quality of the batteries in use varies. Thus, there is a need for the battery-powered device to determine whether individual batteries or battery cells have been inserted into the battery shaft.

SUMMARY

This application provides a system for monitoring and determining whether ordinary battery cells, a battery pack, and a charger unit are attached to a battery-powered device. The system determines the presence of the battery cells by providing a center contact to measure the voltage that is present in the battery shaft by measuring the voltage of the individual batteries. The center contact also may make contact with a battery pack and determine when a battery pack is installed in the battery shaft or housing. The center contact may make contact where the connection of the negative pole of one battery makes contact with the positive pole of a second battery when regular batteries are inserted in the battery shaft. The voltage of the individual batteries may be monitored in this configuration. If a battery pack is installed, the center contact will sense the signal voltage from the battery pack. Communications may be established with the battery pack.

The system also provides a method for determining whether a battery pack or ordinary batteries are inserted into the battery shaft. Whether a battery pack or ordinary batteries are inserted into the battery shaft may be determined by measuring voltages present at the center contact and comparing the measured voltage to a range of predetermined voltages. A voltage within a given range may indicate that ordinary batteries or a battery pack are installed and the battery-powered device enters that mode, conditioning the electronics for receiving power from the batteries. If the voltage falls outside that range, it may mean that the battery-powered device is connected to a charger unit and the regulation electronic unit conditions the battery-powered device to receive power from the charger and may set up communications with the charger. The charger may recharge the batteries if they are the rechargeable type.

If the charger is not installed, then the voltage falling outside of the voltage ranges may indicate that a smart battery pack is installed and the battery-powered device may enter another mode to communicate with the battery pack. Another command line may sense when the charger unit has been attached, and the battery-powered unit may enter a further mode that enables communications between the charger, the smart battery pack and the battery powered device. In this mode, the charger may be the master, monitoring the condition of the smart battery pack and establishing communications by transmitting queries while the battery-powered device is the slave, only responding to the queries. In other configurations, the roles of master and slave between the charger unit and the battery-powered device may be reversed.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
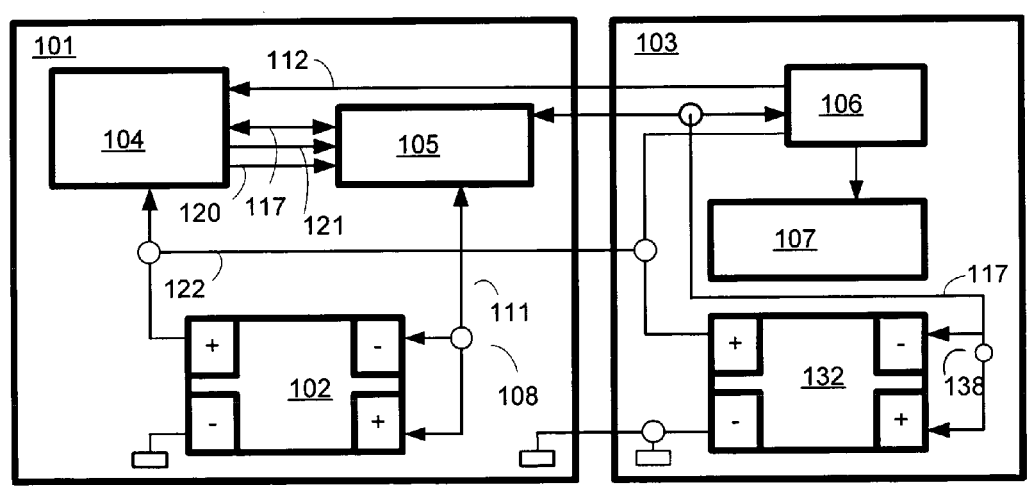
FIG. 1 is a block diagram of a battery-powered device.

FIG. 1 is a block diagram of a battery-powered device 101 with an attached charger unit 103. The battery-powered device 101 may be a laptop computer, camera, microphone, headset, dictation machine, cell phone, power tool, or any other battery-powered device that is known or that which becomes known. Also attached to the battery-powered device is a battery shaft 102. A battery unit such as an ordinary battery, a storage (rechargeable) battery, or a battery pack may be inserted into battery shaft 102. A battery unit may contain multiple batteries or battery cells. The battery shaft 102 may be a slot for inserting individual batteries or a battery pack. The battery pack is a smart battery pack that contains electronics for communicating with the battery-powered device 101. Although individual ordinary batteries and/or cells may be included in a holder that is sometimes referred to as a battery pack, such a battery pack functions here as an ordinary battery.

The battery-powered device 101 may include a control and regulation electronic circuit 104. The control and regulation circuitry 104 may regulate the line voltage or otherwise provide a line voltage regulation circuit 105. The line voltage regulation circuit 105 may be part of the control and regulation circuitry 104. The control and regulation circuitry 104 may be referred to as the "device regulation electronics unit" or the "device regulation unit." In some operational modes, a control mode may be evident rather than a regulation mode because the device regulation unit 104 may have a controller, microcontroller, or processor. In other words, the device regulation unit 104 may control the operation rather than regulate the voltage. The terminology of the device equally refers to both of the operations and does not necessarily represent an operational or technical restriction of the device regulation unit 104.

The attached charger unit 103 may have an electronic control and regulation circuit 6 that controls or regulates a controlled current source 107. This electronic control and regulation circuit 106 may also be known as a "charger regulation electronic unit" or the "charger regulation unit." In some operational modes, a control mode may be evident rather than a regulation mode because the charger regulation unit may have a controller, microprocessor, or processor. As mentioned previously, the naming terminology for the device does not represent an operational or technical restriction in the function of the device.

The charger 103 also may have a battery shaft 132 or battery slot. The insertion size of the shaft 132 may geometrically correspond to the battery size. It is not necessary that a battery pack be inserted fully into the battery shaft 132 as long as the battery pack has an insertion portion that will fit into the battery shaft 132. Some battery packs may extend outside the battery shaft 132 and still be accommodated by the charger unit 103. This may be true for the battery-powered device 101 as well. The battery pack does not need to be fully inserted into the battery shaft 102 as long as the connection between the battery pack and the shaft are fully accommodated. Only part of the battery pack need be inserted into the shaft for the appropriate connection to the battery-powered device 101.

The charger unit 103 may be connected to the battery-powered device 101 via an interfacing connection (not shown). The connection may permit both the supply of charging current and voltage to the batteries or battery pack in the battery shaft 102. A data exchange also may occur between the charger regulation unit 106 and the device regulation unit 104.

FIG. 1 shows the connections between the components of the battery-powered device 101 and the components of the charger unit 103. The negative pole of the battery shaft 102 in the battery-powered device 101 may be connected directly to ground. Another line 122 connects the positive pole of the batteries to the device regulation unit 104. During operation, the device regulation unit 104 also may connect to the charger unit 103 through the line 122. In the charger unit 103, a controlled current source 107 and the charger regulation unit 106 may be electrically connected to the device regulation electronics unit 104. The charger regulation circuit unit 106 may connect to the positive pole of battery shaft 132 in the charger unit 103. The charger regulation unit 106 may monitor the voltage from the batteries and storage batteries that are inserted in the battery slot 132. As used herein, a battery shaft 102 is synonymous with a battery slot. In the shaft 102, the batteries may be stacked or be arranged end-to-end. In the battery slot, the batteries also may lie side-by-side with the electrical connections made at the ends of the slot.

FIG. 1 shows both a battery slot 102 in the battery-operated device and an available battery slot 132 for holding batteries in the charger unit 103. However, a mechanical blocking device may prevent the insertion of a battery pack into the battery slot 132 of the charger unit 103 when the charger unit 103 is connected to the battery-powered device 101. Individual battery packs may be treated differently since they may have different levels of charge or the voltages of the individual packs may be slightly different. Such battery packs having different states of charge should not come in contact with one another.

On the battery slot 132 of the charger 103 is a center contact 138. The center contact 138 is shown as a double contact, but electrically the center contact 138 is a single point. Individual batteries or battery cells may be inserted in the battery slot 132. The center contact 138 contacts the double contact terminal that connects to and is common to the pair of batteries. The center contact 138 may connect the double contact to the charger regulation unit 106 and the line voltage regulator 105 in the battery-powered device via line 117. In a configuration, where more than two batteries or battery cells are inserted in the battery shaft 102 and 132, then a center contact will be provided for each pairing of batteries. For example, if three batteries are inserted, then two center contacts may be provided. For four batteries or battery cells, three center contacts may be provided and so on.

Figure 2:
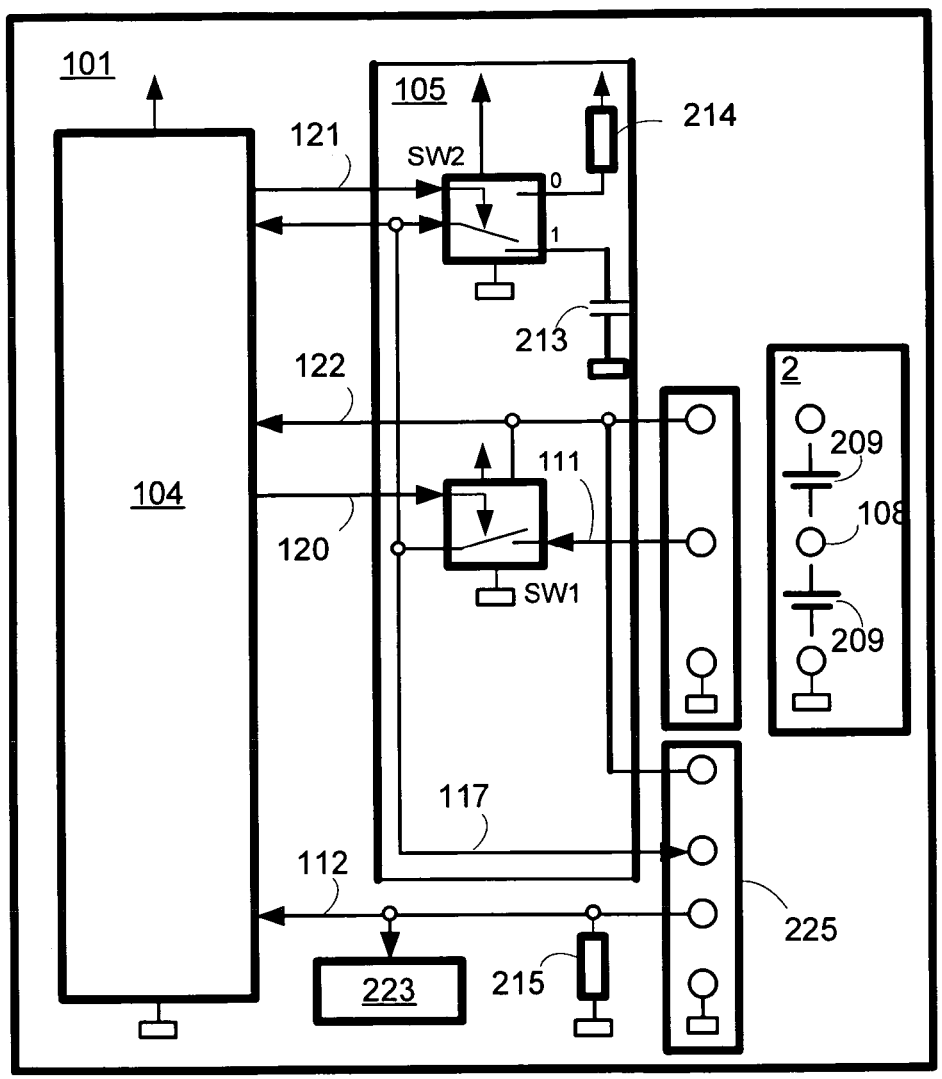
FIG. 2 is a block diagram of a battery-powered device without a charger unit.

As shown in FIG. 2, the connecting line 117 may pass through the line voltage regulator 105 and connect to the switch SW1. The line 117 also may continue through switch SW1 connecting to switch SW2 and the device regulation electronic unit 104. The line voltage regulator 105 receives signals from the device regulation unit 104 and actually may be part of the device regulation unit 104. This line 117 may provide a connection for transmitting the data may exist between the device regulation unit 104, the line regulation unit 105, the charger regulation unit 106, and the center contact 138 in the charger unit 103.

In FIG. 1, the center contact 108 may be present in the battery slot 102 of the battery-powered device 101. The center contact 108 is connected to the line voltage regulator 105 through line 111. Although the center contact 108 is shown as a double contact, electrically the contact is the same. Since the positive pole of one battery is attached to the negative pole of the other battery cell, the voltages at both poles will be identical since they are in contact with one another and are essentially the same electrical point. Line 111 may provide a connection for transmitting data between the device regulation unit and the center contact 108 that may connect to a battery pack.

In FIG. 1 a direct connection, referred to as a command connection 112 or the "DEVICE START" line 112, between the charger regulation unit 106 and the device regulation unit 104 is shown. The device regulation unit 104 senses the signal on the DEVICE START line 112 to determine whether the charger unit 103 is connected to the battery-powered device 101. When connected, the device 101 may adapt its operation to the attached charger unit 103.

FIG. 2 shows in more detail the battery-powered device 101 with two batteries 109 (or two battery cells) inserted in the battery shaft 102. The voltage at the center contact 8 may be monitored via line 111 through a switch SW1. The switch SW1 may be located in the line voltage regulator 105 and connect to the device regulation electronic unit 104 via line 117. The switch SW1 may be controlled by a signal on the command line 120 from the device regulation electronics unit 104; the signal being an OUTPUT LOW or an OUTPUT HIGH for isolating the line 117 from the line 111. The line 111 connects to center contact 108 when the battery-powered device 101 enters the battery operated mode. When the battery-powered device 101 is in the battery mode and the charger unit 103 is attached the center contact 108 may be isolated from the device regulation electronic unit 104. In this configuration, as discussed in more detail below, communication between the battery-powered device 101 and the attached charger unit 103 may be possible while the batteries are charged.

Switch SW1 may be a CMOS-switch, or other equivalent switch, which may work in an analog mode and prevent the discharge of the batteries when the battery-powered device is switched off. The device regulation electronic unit 104 may not be supplied current through the protective diodes (not shown) in the device regulation electronic unit 104. By supplying the total potential of the batteries in the power-off mode and reverse biasing the protective diodes, the protective diodes may prevent the flow of current from the device regulation unit 104. The diodes may become active and allow current to flow during regular use when the supply voltage of SW1 is brought to a working potential.

The switch SW2 may be an analog CMOS multiplexer, or other equivalent multiplexer, that also may be a part of the line voltage regulator 105. Switch SW2 may connect the device regulation electronics unit 104 to a capacitor 213 that may serve as a filter for the DC voltage. A pull-up resistor 214, required for data interfacing, may be disconnected from the device regulation electronic unit 104 when the capacitor 213 is connected. With the pull-up resistor 214 disconnected, the system may avoid a distortion of the DC measurement. When the charger unit 103 is disconnected from the connecting port 225, the switch SW2 may be set to the configuration described above.

With ordinary batteries 209 (two cells) inserted in the battery shaft 102, the center contact 108 may measure a voltage between about 0.5 V and about 2 V. The center contact 108 may transmit the voltage along line 111, through switch SW1 and line 117 to the device regulation unit 104. When the voltage is in the range of about 0.5V to about 2.0V, the battery-powered device 101 may select, and operate in, a battery operation mode.

Figure 3:
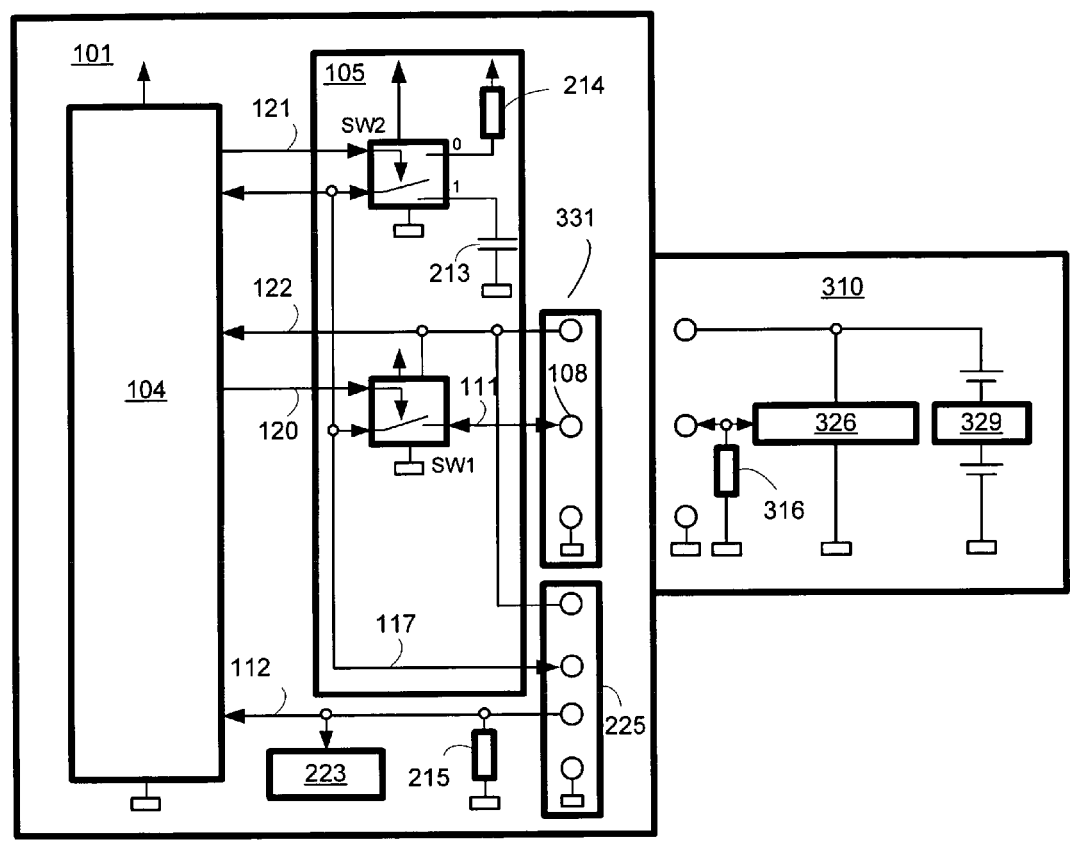
FIG. 3 is a block diagram of a battery-powered device with a battery pack attached.

In another configuration of an operating mode, a battery pack 310 may be inserted in the battery shaft 102 instead of ordinary batteries 209. FIG. 3 shows an arrangement with a battery pack 310 inserted in the battery slot 102. The device regulation electronics unit 104 detects the battery pack 310 by sensing a low voltage at the center contact 108. The low voltage may be less than about 0.5 V. A pull-down resistor 316 may be provided in the battery pack 310 so that the center voltage measured by device 101 lies below about 0.5 V. This voltage signal may cause the battery-powered device 101 to select the operational state for the attached battery pack 310. The regulation electronics unit 326 in the battery pack 310 may communicate with the battery-powered device 101 and function in the slave mode, responding only to queries from the battery-powered device 101. The battery pack 310 also may be protected from short circuits by a fuse 329 which may be located between the two storage battery cells within the battery pack 310.

When the battery pack mode is selected, the switch SW2 may connect the pull-up resistor 214 generating the high level signal for the open-collector-bus system. The capacitor 213 serving as a filter for the DC voltage may be disconnected so that it may not delay data during communications with the battery pack 310. The switch SW2 may be controlled by a signal on the command line 121 from the device regulation electronic unit 104. The available signals are OUTPUT LOW and OUTPUT HIGH. The LOW signal may be associated with the batteries 209 inserted and the HIGH signal with the operation of the battery pack 310. In the present configuration of the battery pack shown, the HIGH signal is present.

The battery-powered device 101 may query the battery pack 310 using digital communication through the charge/ regulation/ONE-wire-interface connector 331 and the center contact 108. This interface connector 331 may be connected via SW1 to the device regulation electronics unit 104 via line 117 and to the center contact via 111. The line 117 may carry, depending on the selected mode, either digital signals or analog signals. It may be used to measure the center voltage of the ordinary batteries, DC MEASUREMENT. The line 117 may be used as an interface to the battery pack 310, as an INPUT for digital signals. When connected to the charger 103, the line 117 may interface with connector 225 and communicate an OUTPUT LOW signal with the charger unit 103.

Figure 4:
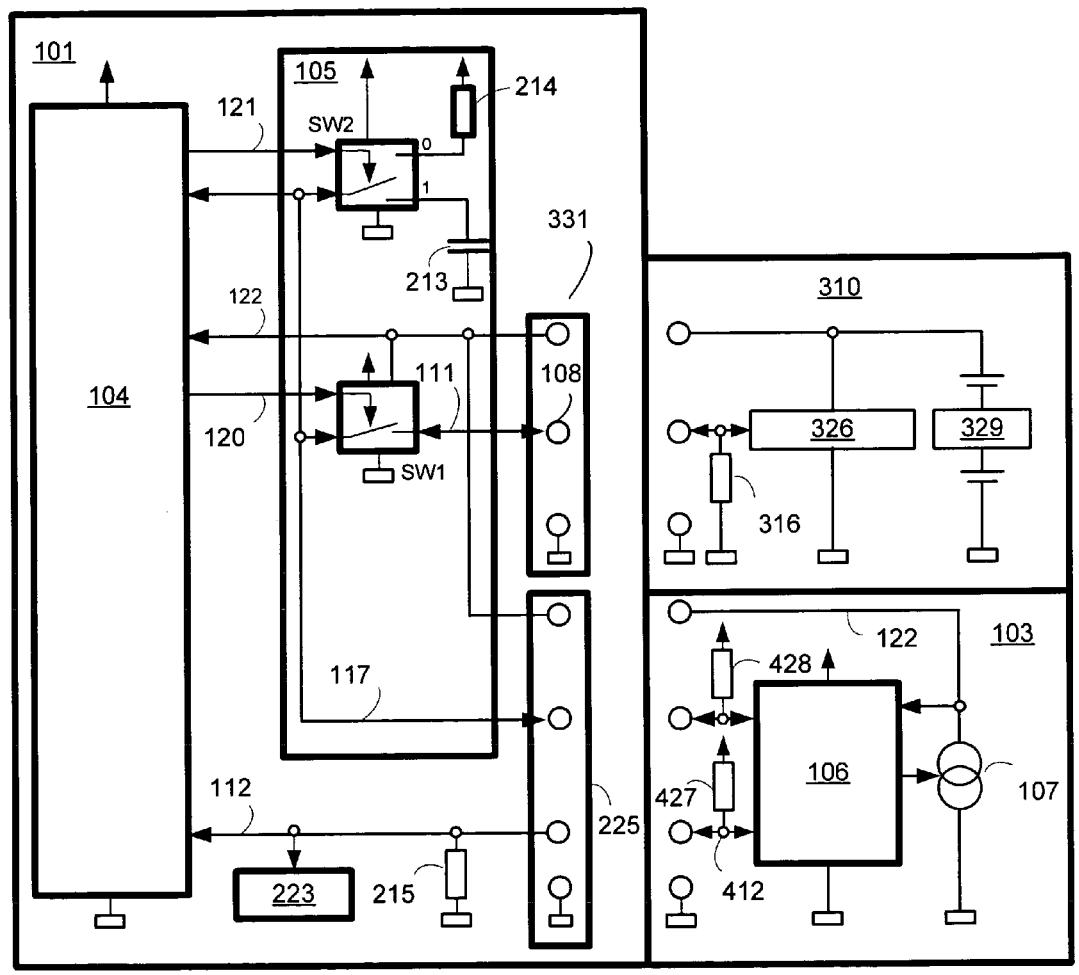
FIG. 4 is a block diagram of a battery-powered device with a battery pack and a charger attached.

FIG. 4 shows a battery pack 310 is inserted in the battery-powered device 101 with a charger unit 103 attached. This is the same configuration of FIG. 3, only the charger unit 103 now is connected to the battery operated device 101. In this configuration, the battery may be charged while the battery-powered device 101 receives operational power. When the charger unit 103 is connected to the battery-powered device 101, a voltage may be sensed on the DEVICE START line 112 in the battery-powered device 101. The pull-down resistor 215 in the battery-powered device 101 and a pull-up resistor 427 in the charger unit 103 may produce a voltage incursion on the DEVICE START line 112. The charger unit 103 will detect the transition by the battery-powered device 101 by way of a power unit 223. In order for this to occur, the port (the command connection) 427 for the signal on the DEVICE START line 112 may be switched to INPUT in order to sense the remote start signal operation sent by charger 103. When the signal is sensed by the ON/OFF circuit 223, also known as a power unit, the battery-powered device may be turned ON. The charger unit 103 may sense the high voltage and the signal will be an indication that the battery-powered device is "remote-started." The voltage incursion is an indication that the charger unit 103 has been attached.

As shown in FIG. 4, a pull-up resistor 428 may be connected to the charger regulation unit 106. The function of this resistor 428 is described later with reference to FIG. 6. As with the example shown in FIG. 2, the device regulation electronic unit 104 may transmit a HIGH signal along the command line 120 to switch SW 1. Switch SW 1 may isolate the center contact 108 from the data line 117 so that communication may be established between the device regulation electronic unit 104 and the charger regulation unit 106 in the charger 103.

Figure 5:
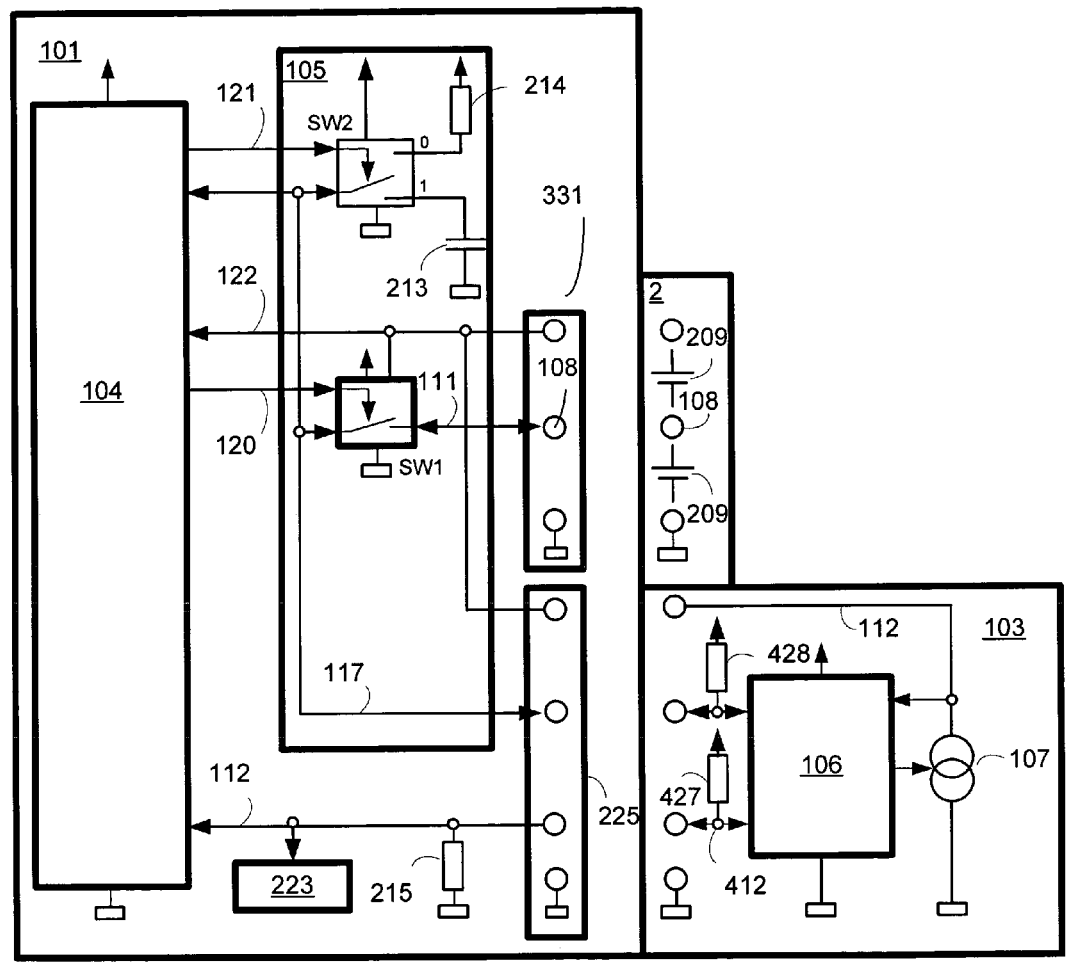
FIG. 5 is a block diagram of a battery-powered device with a battery and a charger attached.

FIG. 5 shows an example where ordinary batteries 209 (rechargeable batteries) are inserted in the battery shaft 102 and a charger unit 103 is connected to the battery-powered device 101. The center contact 108 may transmit a voltage above about 0.5 V to the device regulation unit 104. The ON/OFF circuit 223 and the device regulation unit 104 also may sense a voltage incursion on the DEVICE START line 112. The device regulation unit 104 may isolate the center contact 108 from the data line 117 by opening switch SW1. The device regulation electronic unit 104 will transmit a HIGH output along command line 120 to open switch SW1. The switch SW2 may connect the pull-up resistor 214 and simultaneously disconnect the capacitor 213 to avoid any delay in the data signal. In this configuration, communications may proceed between the battery-powered device 101 and the charger unit 103.

Figure 6:
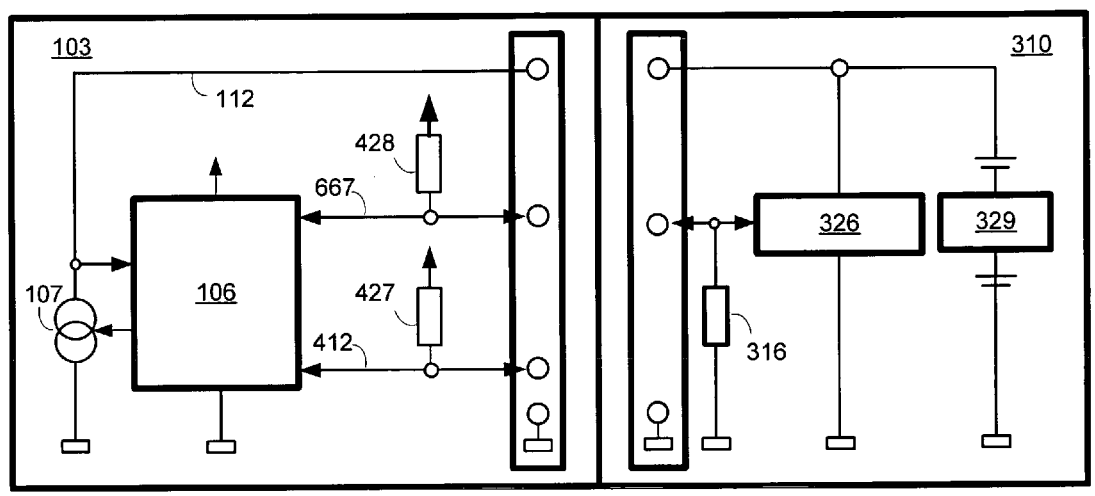
FIG. 6 is a block diagram of a charger unit with a battery pack inserted.

FIG. 6 shows a charger unit 103 disconnected from a battery-powered device 101 with a battery pack 310 inserted into battery shaft 132. The charger regulation unit 106 may recognize the connection with the battery pack 310 by the change in voltage on the "charge plus" DC line 112. The "charge plus" line 112 may be used to measure the total voltage of the inserted batteries, storage batteries, or battery pack. Since the battery-powered device 101 is not connected, there will be no signal developed from the pull-up resistor 214 along line 663. A pull-up resistor 428 (mentioned previously) may be provided in the data line 667. The pull-up resistor 428 may perform the same data exchange operation as the pull-up resistor 214 in the battery-powered device 101, but recognizes that the connection is to the inserted battery pack 310.

Figure 7:
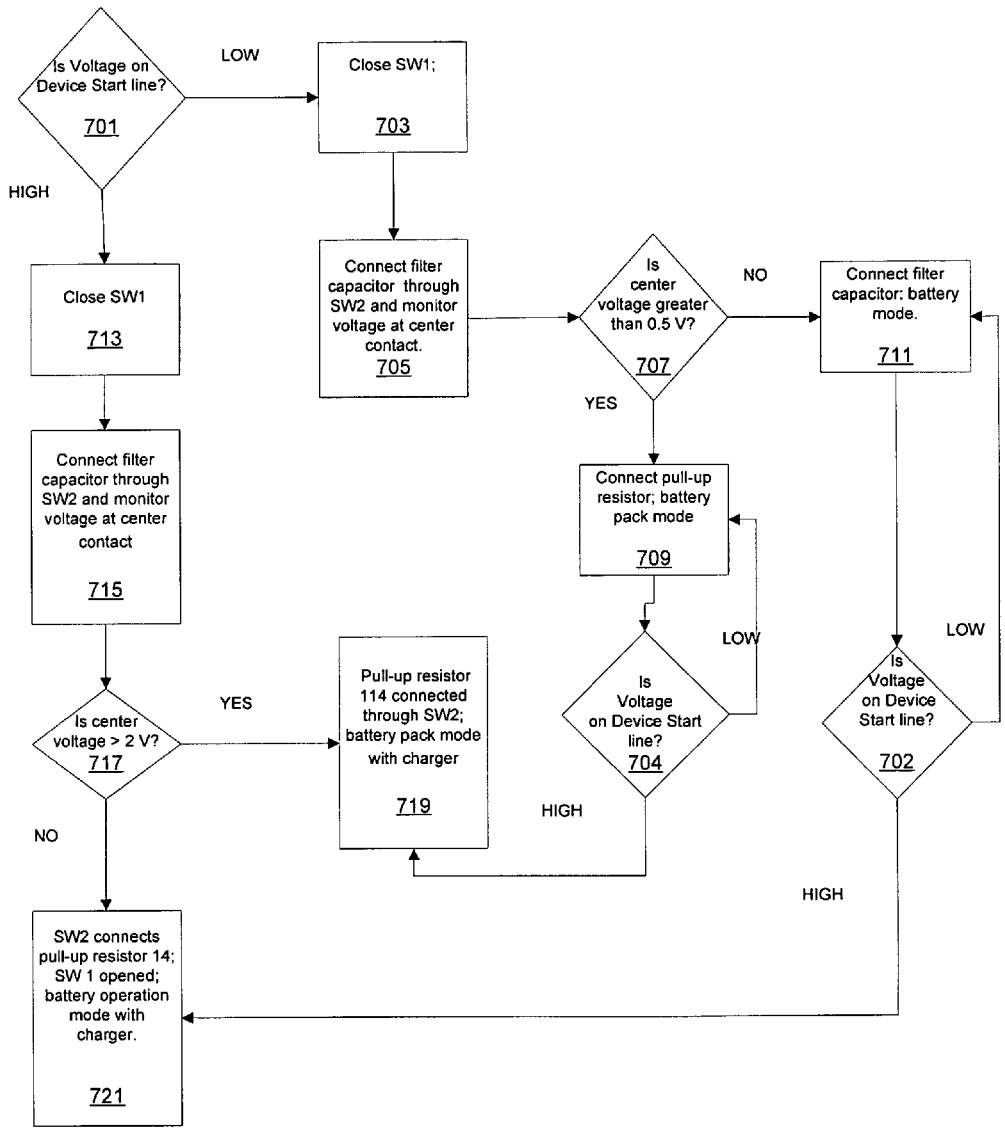
FIG. 7 is a flow diagram for a method of operation of the battery-powered device.

The battery-powered device 101 may check the individual operating parameters periodically during operation to determine whether a charger unit 103 may have been connected during operation. Other operating parameters such as dead batteries 209 and an empty battery shaft 102 may be checked. While checking the operating parameters, relevant conditions are checked as shown in FIG. 7. For example, a determination of the voltage on the DEVICE START line 112 may be made 701. If the voltage is LOW then the voltage is in an off-state meaning that the charger unit 103 may not be connected to the battery-powered device 101. In the off-state, the switch SW1 may be closed 703, thus connecting the device regulation electronic unit 104 to the center contact 108. Switch SW2 may connect the capacitor 213 by a signal 705 via command line 121. The device regulation electronic unit 104 may measure 707 the center voltage at the center voltage line 111.

If the voltage from the center contact 108 is less than 0.5 V, then the device regulation unit 104 may send a signal on the command line 121 at step 709 in FIG. 7 disconnecting the capacitor 213 and connecting pull-up resistor 214. The low voltage at center contact 108 signifies that the battery pack 310 is attached to the battery-powered device 101 as configured in FIG. 3. The battery-powered device 101 may follow the data protocol for communicating between the battery-powered device 101 and the battery pack 310.

If the voltage from the center contact is greater than 0.5 V, then a battery operation mode is selected. Two battery cells 209 may be installed in the battery shaft 102. In this mode, the filter capacitor 213 will be connected 711 to the center contact 108. The configuration of FIG. 2 will be realized. During the battery operation, an evaluation of the remaining time of the charge remaining on the batteries may be performed. This evaluation of the remaining charge may be performed according to U.S. Pat. No. 6,344,730 A, and is incorporated herein by reference in its entirety.

In another example, the voltage on the DEVICE START line 112 may be HIGH. The battery-powered device 101 may recognize that the start signal is in an on-state. The on-state may mean that the charger unit 103 is connected to the battery-powered device 101. The command signals may be transmitted by the device regulation electronic unit 104 via the command lines 120 and 121 to the switches SW1 and SW2, closing the switch SW1 713 and connecting 715 the capacitor 213 to line 117. The device regulation electronic unit 104 may measure 717 the center voltage at the center contact 108.

If the center voltage is greater than 2 V at the center contact 108, the switch SW2 may connect 719 the pull-up resistor 214 to line 117 with a signal on command line 121. The battery-powered device 101 may operate in the configuration of the battery pack 310 and the charger unit 103 attached. This configuration is shown in FIG. 4. The charger unit 103 may operate in a master mode and the battery-powered device 101 may switch to the slave mode and receive commands from the charger unit 103.

If the center voltage is less than 2 V from the center contact 108, the battery-powered device 101 is operating in the battery operational mode with two battery cells 9 and the charger 3 connected. The device regulation electronic unit 104 may command switch SW2 to connect 721 the pull-up resistor 214 to line 117 via command line 121. The device regulation unit 104 will command switch SW1 to open via command line 120. The configuration of FIG. 5 may be realized. In this configuration, the data line 117 between the charger unit 103 and the battery-powered device 101 may be isolated from the center contact 108 so that a data exchange can occur between the two units 101 and 103. The charger unit 103 may assume the master function and the battery-powered device 101 may assume the slave mode and receive commands from the charger unit 103.

In another example, if the DEVICE START line 112 should reach a HIGH state during operation 702, the battery-powered device 101 may switch from the battery pack operational mode 711 to the mode where the battery pack and charging unit are both attached 721. Alternatively, if the battery-powered device 101 is operating in the battery pack mode 709 and the battery-powered device 101 determines 704 that the DEVICE START line 112 transitions to a HIGH state, then the battery-powered device 101 may switch to the mode 719 where the charger unit 103 is connected to the battery-powered device 101. If the charger is disconnected, the battery-operated device 101 may transition back to either the battery pack mode or the battery mode dependent upon the inserted battery unit.

The stated voltage ranges and limits by which the individual modes of operation are determined may be set by establishing the values of the resistors and the currents that may be flow through them. The resistors may be selected in combination with the associated electronics of the device regulation electronic unit 104, the charger regulation unit 6, and the various leakage currents that may be present in the device 101.

Resistance values smaller than 100 kΩ may be used for the pull-up resistors. Resistance values greater than 100 kΩ maybe used for the pull-down resistors. A total series resistance value of less than 10 kΩ should be chosen if the intended transmission rate is 500 bits/sec or more. If a faster data rate is sought, the resistances may be smaller than those listed above.

Not shown in the drawing is the geometric provision that the battery slot 102 has a geometry (form and size) which makes it possible to insert two batteries e.g. so called dry cells without any case or housing. This makes it very easy to use the device even under rather rough conditions and in exotic places, because such dry cells are available everywhere. Logically, the battery pack that may be used with this device has the same geometry and size, at least in that part which is inserted into the battery slot 102. It is possible for many applications to use a battery pack that protrudes from the device without any disadvantage.

The connection unit 225 may have the same geometry as the battery slot 102. By providing the same geometry, the number of molds that may be required for a battery-powered device 101 housing may be reduced. A standard geometry for the battery shaft 102 may allow for a multitude of batteries that may have the same shape and geometry to attach to the battery-powered device 101. Therefore standard batteries, battery packs and chargers may be used with the device 101.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for providing power to a battery-powered device comprising:
   a device regulation unit to determine a state of a charge in a battery unit,
   a center contact operatively connected to the device regulation unit that detects a voltage from the battery unit to identify a type of the battery unit;
   a first switch operatively connected between the device regulation unit and the center contact to isolate the center contact from the device regulation unit;
   a second switch operatively connected to the device regulation unit and operatively connected with a filter depending on the type of battery unit; and
   a charger unit having a charger regulation unit the charger unit operatively connecting to the battery-powered device.

2. The system of claim 1, where the type of the battery unit comprises a battery, a battery cell, a plurality of batteries, a plurality of battery cells, or a battery pack.

3. The system of claim 1, further comprising a battery shaft that provides the center contact, where the battery shaft receives the battery unit.

4. The system of claim 3, where the battery shaft is attached to either the charger unit or the battery-powered device.

5. The system of claim 1, further comprising a battery shaft that provides the center contact for each pairing of inserted batteries or battery cells.

6. The system of claim 1, further comprising a display operatively connected to the device regulation unit for displaying the state of the charge of the battery unit.

7. The system of claim 1, further comprising a regulation electronic unit associated with the battery unit.

8. The system of claim 1, further comprising at least two battery cells in the battery unit and a fuse electrically connected between the two battery cells.

9. The system of claim 1, where the second switch connects a data line to a pull-up resistor and disconnects the data line from the filter connected to ground when the battery unit is operatively connected to the battery-powered device.

10. The system of claim 1, where the center contact is in communication with a terminal common to a pair of batteries or battery cells in the battery unit to measure voltage.

11. The system of claim 1, where the center contact is in communication with a contact on the battery unit for data transfer.

12. The system of claim 1, where the first switch interrupts the connection between the device regulation unit and the center contact when the charger is connected to the battery-powered device.

13. The system of claim 1, further comprising a command connection between the charger regulation unit and the device regulation unit.

14. The system of claim 13, further comprising a power unit operatively connected to the command connection.

15. The system of claim 13, further comprising an ON/OFF circuit connected to the command connection.

16. The system of claim 1, where the second switch connects a data line to a pull-up resistor and disconnects the data line from the filter connected to ground when the battery-powered device is operatively connected to the charger unit.

17. The system of claim 1, further comprising a battery slot where the battery slot is configured for insertion of two batteries or battery cells.

18. A portable electronic device comprising:
   means for storing electrical energy connected to the portable electronic device; regulating means for determining a state of a charge in the means for storing electrical energy;

means for measuring a voltage; means for determining a type of battery used as the means for storing electrical energy based on the measured voltage means for connecting the regulating means with a filtering means depending on the type of battery unit with a first switch; and means for charging the means for storing electrical energy connected to the portable electronic device.

19. The device of claim 18, further comprising a regulation electronic circuit associated with the means for storing energy.

20. The device of claim 18, further comprising a regulating means associated with the means for charging the means for storing electrical energy.

21. The device of claim 18, further comprising a command connection between a regulating means associated with the means for charging and the regulating means.

22. The device of claim 21, further comprising a power unit operatively connected to the command connection.

23. The device of claim 18, further comprising a second switch that connects a data line from the means for storing electrical energy to a pull-up resistor when the portable electronic device is connected to the means for charging and disconnects a filter capacitor connected to ground.

24. A method for providing power to a battery-powered device comprising:

storing electrical energy in a battery unit connected to the battery-powered device;

detecting a voltage from the battery unit with a center contact;

regulating the storing electrical energy with a regulation unit by determining a state of a charge in the battery unit when storing the electrical energy;

determining a presence of the battery unit based on the state of the charge in the battery unit;

determining a type of the battery unit based on the voltage from the battery unit;

isolating the regulation unit from the center contact with a first switch;

connecting the regulation unit with a filter with a second switch, where the connection depends on the type of battery unit; and charging the portable electronic device.

* * * * *